Aug. 11, 1959        J. W. PHIPPS         2,898,628
                MELT-SPINNING APPARATUS
Filed June 23, 1954                 4 Sheets-Sheet 1

INVENTOR
JOHN WILDEY PHIPPS
BY Cushman, Darby & Cushman
ATTORNEYS

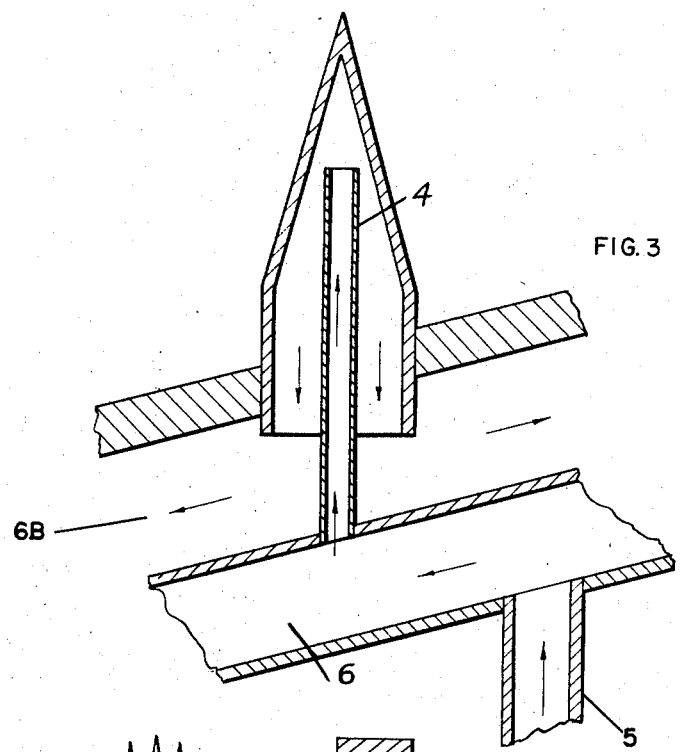
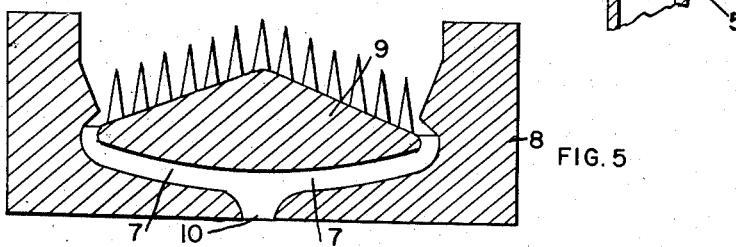
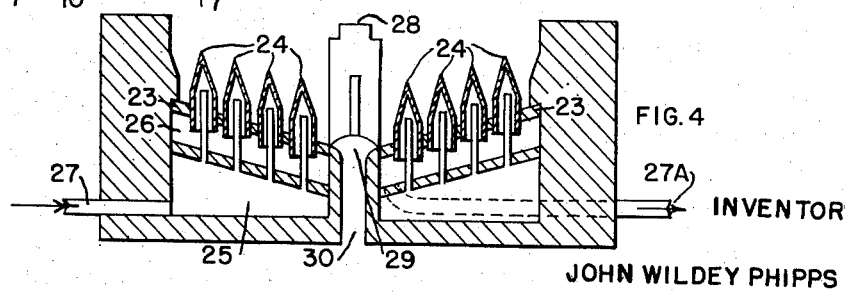

Aug. 11, 1959  J. W. PHIPPS  2,898,628
MELT-SPINNING APPARATUS
Filed June 23, 1954  4 Sheets-Sheet 3

INVENTOR
JOHN WILDEY PHIPPS
BY
ATTORNEYS

United States Patent Office 2,898,628
Patented Aug. 11, 1959

2,898,628

MELT-SPINNING APPARATUS

John Wildey Phipps, St. Albans, England, assignor to Imperial Chemical Industries Limited, London, England, a corporation of Great Britain Application June 23, 1954, Serial No. 438,695

Claims priority, application Great Britain July 3, 1953

9 Claims. (Cl. 18—8)

This invention relates to an improved apparatus for the melt-spinning of artificial filaments from fibre forming polymers. More particularly it provides an improved apparatus for the melt-spinning of these materials, in the form of chips.

In the melt-spinning of artificial filaments the fibre forming material is commonly melted on a heated grid. The molten material accumulates in a pool below the grid before being conveyed by a metering pump through a filter pack to the spinneret. Melting on the grid is slow and proceeds only at a rate which is approximately proportional to the plan area of the grid. When a higher melt-rate is required using this apparatus the heated grid has to be very large, in proportion to the spinning apparatus used, which makes it unwieldy. To obtain a really high melt rate a combination of a pressure feed with a grid or a perforated heated plate has been proposed, but the melt-rate of even this apparatus compared with its size is still low and difficulties have been experienced, caused by irregularities in the flow of the melt from the grid or plate.

We now provide an improved apparatus whereby we obtain a higher melt rate and an even and rapid flow of the melt from the melter.

According to our invention we provide an improved melt-spinning apparatus which comprises a feed passage for solid polymer such as chips, leading to a melting unit made up of a number of hollow individual heater members e.g. hollow cones or pins and a support, such as a plate or block, for said heater members which are packed closely together and project from the support along the line of feed of the solid polymer so as to permit the passage of melt while restraining the unmelted polymer, and at least one aperture positioned beyond the heater members which permits the melt to flow to the spinning pump or pumps.

The projecting members are hollow to permit internal heating. This heating can be obtained by electric means but we prefer heating by fluids such as vapours e.g. diphenyl and diphenyl oxide, silicones, dimethyl terephthalate, chlorinated phenols and super-heated steam, as this method of heating allows all the members to be heated to the same temperature without difficulty. One method of fluid heating comprises fitting each member with an inlet tube and by connecting the inlet tube of each member in parallel to the supply of a heating fluid and having outlet ducts for the return flow of the heating fluid.

The support from which the members project may be in the form of a plate or a more solid block. The surface from which the heater members project can be flat or can be funnel-shaped with a single aperture, corresponding to the neck in a funnel, so that the polymer which has melted can flow freely between the projecting members and out through the central aperture in the funnel-shaped heated support. Other shapes of support can be used without departing from the spirit of our invention. The support can be concave or convex and can be conical, parabolic, hyperbolic, spherical or even unsymmetrical in design, the requirement being that an even flow of the melt is made possible. When a convex support is used it is preferred that the annular aperture on the periphery of the support is designed to lead into one central channel to homogenize the melt before it passes through one or more ducts leading to the spinning pump or pumps.

The size, shape, and the spacing between the heater members can be chosen to suit particular requirements. These may depend, for example, on the properties of the fibre forming material such as the viscosity of the melt and the latent heat of fusion at the operating temperature for a given output; on the pressure under which the material is fed to the melting unit; and on the rate of melting required.

The length of the path of the material between the heater members and the length and volume of the paths thereafter to the pump must be such that at the maximum melt rate only a homogeneous melt of the material reaches the intake to the pumps. A careful choice of dimensions must be made having regard to prevailing operating conditions and the characteristic of the material to be converted. The heater members should preferably be tapered towards their tips and the angle of the tapering tips should be as small as possible, compatible with the mechanical requirements of rigidity under the loading from the chip feed mechanism. At the same time the wall thickness must be such, as to allow an efficient heat exchange between the internal circulating heating fluid and the polymer chips impinging on the exterior. The members can be arranged so that their tips are all in a level plane or they can be arranged so that the tips may rise or fall towards the centre of the support. The projecting members may be all of the same length or they may vary to achieve any desired positioning of the points thereof.

In a preferred embodiment of our invention the individual heater members are fitted with internal tubes through which heating fluid is injected close to the tips of the projecting members in sufficient quantities to ensure an adequate heat exchange. When vapours are used this is brought about easily by circulating the fluids at a velocity which is sufficient to remove the condensate as it is formed. The return of the heating fluid should still contain a proportion still in the vapour phase for efficient working. When all the projecting members are connected to a common heating-fluid supply system an even, uniform heating of all the projecting members is obtained.

It is also preferred that all the heater members should be parallel and vertical as this enables a simple symmetrical design for the melter and gives a uniform surface together with desirable flow channels for the melt. A particularly useful design comprises members of the same shape and size which are set in the concave or convex support at different depths so that their tips are all in one plane at the same level.

The following descriptions and the attached drawings illustrate but do not limit our invention.

Fig. 3 is a vertical section through a heater member, showing the flow path for a heating fluid.

Fig. 4 is a section through a melting unit fitted with the heater members of Fig. 3, and having a flanged supporting shaft 28 for the end of a screw conveyor.

Fig. 5 is a diagrammatic section through a melting unit with a cone-shaped convex support with ducts for the melt at the periphery of the melter.

Figure 1:
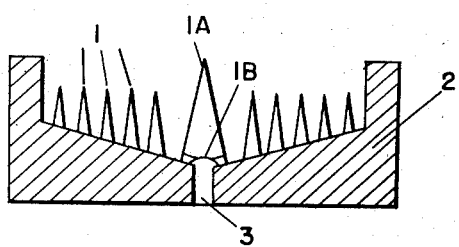
Fig. 1 is a simple diagrammatic sectional elevation of a melting unit with conical heater members and a central duct for the melt, illustrating the general principle of the melting unit of our invention.
Figure 2:
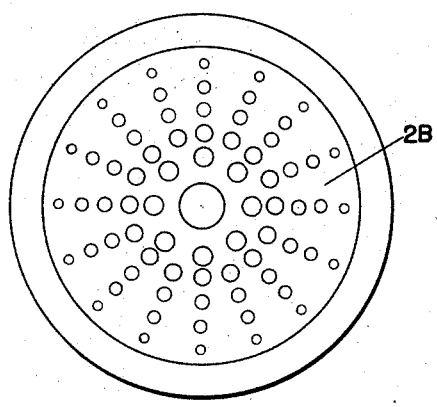
Fig. 2 shows the melter of Fig. 1 in plan view.

In Fig. 1, a number of individual cone-shaped heater members 1 are mounted in a funnel-shaped base 2 having a central duct 3 for the egress of the melt. The duct is shielded with an outsize cone-tipped member 1A, which has an opening 1B in the stem, large enough to allow unrestricted flow for the melt, but prevents unmolten polymer, usually used in the form of chips, from obstructing the main central duct 3.

When the projecting members are to be heated internally with heating fluids they should preferably be fitted with a separate inlet tube for the heating fluid. This is shown in Fig. 3 which is a detailed section through a heater member and where 4 is the inlet tube, which is connected to the main inlet 5 of the heating fluid through a chamber 6. The heating vapour flows up through the tube 4 and across the inside of the tip of the hollow member, due to the pressure difference maintained between the fluid in the inlet chamber 6 and that in the outlet chamber 6B.

Figure 6:
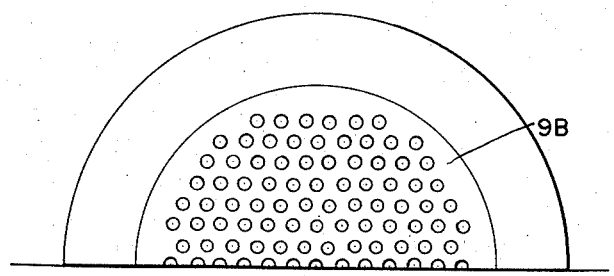
Fig. 6 is a plan diagram showing one half of the melting unit of Fig. 5 with uniformly spaced pins.

The approximate spacing and arrangement of the heater members and their relative size is shown in Figs. 1, 2, 4, 5, 6, 7, 8 and 9. For example in Fig. 2 it can be seen that the spacing between the individual heater members is not uniform and the space between individual members narrows towards the centre. On the other hand the spacing between the members in Fig. 6 is uniform and each member tapers to a uniform cross-section at its base where it is mounted in the support 9B. It will be appreciated that the spaces between the members can be varied either by varying the pitch of members of uniform size or by varying the size of pins of uniform pitch, or by providing the pins with flanges or skirts of uniform or non-uniform width.

Fig. 4 shows a number of heater members mounted in a melting unit with a funnel-shaped support 23. The heating fluid is supplied through an inlet 27 to the heater members 24 through a common chamber 25. The return flow is by way of the collecting chamber 26 and thence out through a pipe at 27A. A large heater member 28, which may be adapted if required to receive a flanged end of a screw conveyor, straddles the aperture 29 and allows free egress of the melt while at the same time preventing obstruction of the main outlet duct 30, by unmelted chips. Because of the uniform pressure in the inlet tubes the entire internal surface of all the hollow members particularly at the tips is maintained at a uniform temperature at any desired maximum, and at the points where efficient heat exchange between the heating vapour and the chip is most desirable. Some heating vapour condenses on the internal walls of the hollow members and escapes together with any uncondensed vapour through the common outlet chamber 26.

Figure 8:
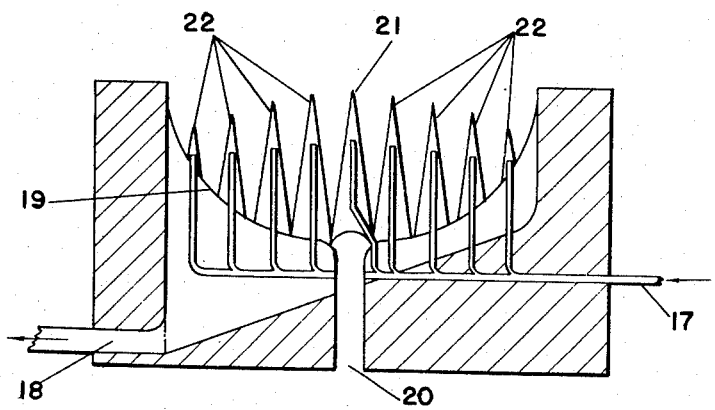
Fig. 8 is a diagram of a vertical section through a melting unit with fluid heated pins having a manifold feed for the heating fluid, a concave support and a central duct for the egress of the melt. The length of the pins decreases towards the periphery of the melter.

Another support of concave form is shown in Fig. 8 at 19 with a central aperture 20 for the egress of the melt. An internally heated cone-shaped member 21 placed over the aperture 20 is designed so as to allow free egress of the melt but prevents unmolten polymer chips from reaching the aperture 20. The pins 22 are individually heated through a manifold feed 17 and increase progressively in size towards the centre of the melter. As a result, the size of the gap between their bases also decreases towards the centre of the melter and this tends to prevent unmolten polymer chips from entering the outflow duct 20.

A convex support is used in an outflow type of melter which is shown in Figs. 5 and 6. The support 9 is shaped like a cone with a plurality of peripheral outlet channels 7 for the melt. The channels are cut in the body 8 and lead to a common duct 10. It will be appreciated that instead of individual outlet channels 7, a single annular outlet channel may be provided extending right round the base 9 and thus separating it entirely from the body 8. The duct 10 can lead to one or a plurality of spinning pumps and thence to spinnerets.

Figure 7:
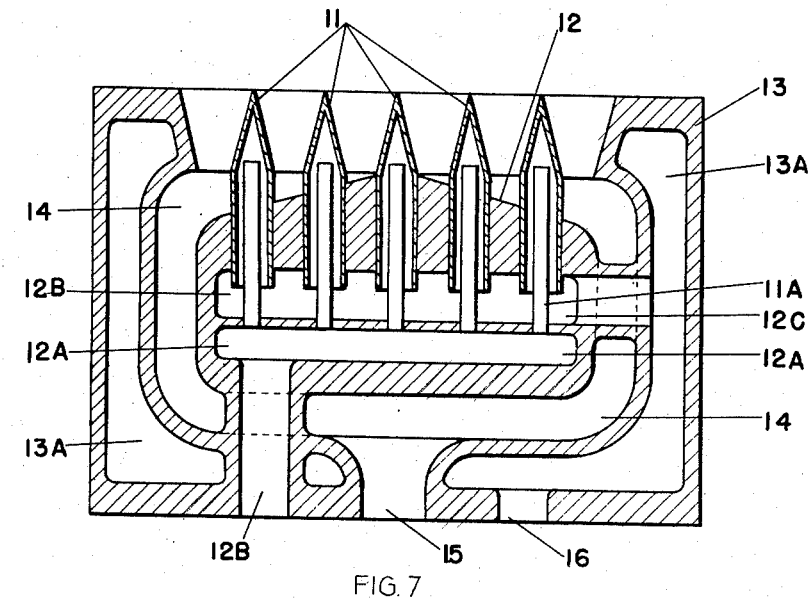
Fig. 7 is a diagram of a vertical section through a convex inverted cone type melting unit with heater members of uniform shape and size, with their tips in one level plane, and showing the ducts for the heating fluid.

Another outflow type of melter is shown in Fig. 7. The hollow members 11 which are of uniform shape and size have their tips tapering to points which all lie in one level plane. The members 11 are set in an inverted cone type support 12 which is hollow and provides a chamber 12A for the distribution of the heating fluid which enters through the inlet 12B. After passing up through the tubes 11A from the chamber 12A it is partially condensed on the inside walls of the heater members 11 and is returned into a collecting chamber 12C, which heats the support and which communicates with the hollow jacket 13A in the casing 13 surrounding but not in contact with the support 12 except as shown. The return flow of the heating fluid is through the outlet 16. The melting polymer comes down from the projecting members 11 onto the hot surface of the support 12 and the homogenised melt flows out through the outflow duct 15 after having passed through the gap 14 between the heated support 12 and the heated casing 13.

Figure 9:
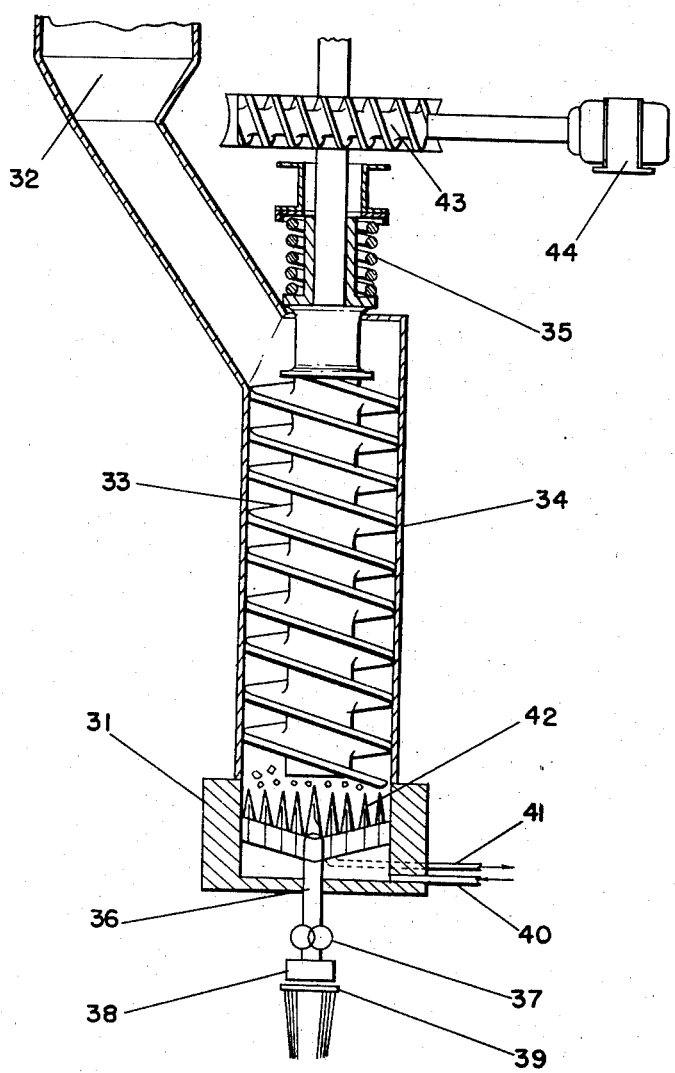
Fig. 9 is a diagram of a complete melt spinning apparatus showing the position of the melting unit, the feed mechanism for polymer chips and the spinning head with the spinning pump and the spinneret.

In one form of apparatus a melting unit as hereinbefore described is placed inside a melt-spinning apparatus and polymer chips are fed to the melting-unit by gravity from a hopper. If a larger throughput is required the pressure of the chips towards the melter must be increased and a suitable mechanical conveyor can be used. This latter form of apparatus is shown in Fig. 9 where a mechanical screw conveyor 33 presses the chips against the melting unit 31 from a hopper 32. The screw 33 is driven by a motor 44 through a worm gear 43. The melting unit 31 has pins 42 which are individually heated through tubes from the inlet duct 40. The return flow of the heating fluid takes place through the outlet 41. If required the pressure of the screw conveyor may be kept constant by slideably mounting the screw in the barrel 34 so that it rises with the resistance from the compressed chips and thrusts against a pressure spring 35 or a pneumatic piston (not shown) so that the load exerted by the screw on the chips remains substantially constant. Good results are obtained when the diameter of the melter unit which is fitted with the hollow heater members is larger than the diameter of the screw conveyor. The polymer chips are sintered into one solid block by the action of the heat from the melter and the presence of the screw conveyor. This block continues to be pressed against the individual heater members and begins to melt. The molten polymer flows through the aperture 36 to the spinning pump 37 which pumps it through a filter pack 38 and extrudes it through the spinneret 39. The hopper 32, the barrel 34 and the screw 33 can be provided with heating means, so that the polymer is preheated when it reaches the melting unit. It will be appreciated that other apparatus such as reciprocating rams could be used for pressing the chips against the melter.

Closer packing and gaps of a regular shape between the heater members can be obtained by having instead of a round cross-section, straight sides in e.g. a hexagonal cross-section. By setting a number of such e.g. hexagonal members in the support at an equal pitch, gaps of uniform width between the members are obtained giving e.g. a honeycomb pattern. A homogeneous treatment of the material to be melted is thus achieved. One convenient method of producing such heater members comprises turning for example hexagonal rods of the required dimension to cone-shaped tips and removing the inside of the members by machining until a wall thickness is obtained which will be adequate to stand up inter alia to the external and internal pressure.

In operation the unmolten polymer will first come in contact with the tips of the heater members which are preferably turned to a point and which are heated internally, then it will slide down, or be forced down, until the original shape of the members e.g. the hexagonal sides are reached by the particles. As the members are preferably set in the support so that the opposing straight sides of adjacent members are parallel they will be restrained by the gaps formed by the opposing sides of the members until they have melted down to a size which would allow them to pass through the gap. Depending on the operating conditions e.g. the type of feeding, the melting temperature and the efficiency of the heat-exchange the gaps are designed to restrain particles over a certain size and to pass smaller particles, which however will also melt before they reach the aperture for the melt to the pumps. This is achieved by having members projecting a certain height so that a sufficient depth of the gaps between the members ensures the melting of the particles, during their passage down the gaps and homogenisation is obtained on the heated support through passage around the base of the members.

If desired the heater members which are machined from e.g. the hexagonal rods can be provided with undercuts so that the neck-portion where the members are set in the support are narrower and e.g. circular in shape and may be provided with a screw thread if desired, by means of which they are fastened to the support. Alternatively the members can be e.g. of circular cross-section and have conical tips, a e.g. hexagonal skirt flange below the conical tip, or a flange at the base. They can be inserted through holes in the support, by driving them in from the underside of the support like nails and brazing, welding or screwing them into position. For ease of manufacture all the members are preferably of the same shape and size except when a concave support is used when the one straddling the aperture for the egress of the melt is of different design incorporating an aperture in the side where it meets the support e.g. when using a melt unit of the type shown diagrammatically in a section in Fig. 1.

The following example illustrates but does not limit our invention.

Polyethylene terephthalate in the form of chips is fed by a screw conveyor to the apparatus shown diagrammatically in Fig. 7. The support is 25 cm. in diameter and contains 250 heater members, the centres of which are 15 mm. apart. The upper portion of the heater members which tapers towards the pointed tip is 50 mm. long and the parallel tubular lower portion or shank is 75 mm. long. The heater members are set in the convex support with their tips in one level plane. They project about 90 mm. at the periphery of the support and the centre heater member projects about 65 mm. from the support. The greatest diameter of the heater members is 6.7 mm. The screw conveyor exerted a uniform pressure on the chips of about 2.8 kg. per sq. cm. of the plan area.

For heating a eutectic mixture of diphenyl and diphenyl oxide, obtainable commercially under the trade name "Dowtherm" was circulated at a temperature of 280° C. The output of the melt was 3.9 kg. per hour.

The apparatus of our invention has many advantages over other known means for melting fibre-forming polymers, in that we obtain an increased rate of melting for a given plan area of the melter because of the increased area of heated surface effectively in contact with the polymer. At the same time the robust construction enables the chip to be pressed against the melter with considerable force.

We have found that cone-shaped hollow members give a particularly efficient heat exchange. Calculations have been made, and experiments have shown, that under otherwise identical conditions, an increased output of 50% can be obtained on a comparative run using cone-shaped hollow pins compared with a perforated plate. Another advantage of our invention is the even flow of melt obtained when a concave base and a single outlet is used or when a number of outlets are provided at suitable points on the periphery of a convex base.

By heating each pin individually by means of heating vapours as described, a very even temperature distribution is obtained over the whole of the melting unit and no overheating or uneven heating can result. The possibility of thermal degradation of the polymer is therefore reduced to a minimum.

The design of the pins and the supporting base allows an even and rapid flow of the melt which can be led directly to the spinning pumps, without the necessity of a melt-pool.

What I claim is:

1. Melt spinning apparatus including means for melting solid polymer comprising a feed passage for the solid polymer, a melt unit below said passage and including an inlet communicating with the bottom of said feed passage, pressure feed means for feeding solid polymer particles through said feed passage and said inlet to said melting unit, said melting unit comprising an inclined support and a plurality of hollow individual heater members arranged on said support and projecting upwardly therefrom substantially vertically, said inlet being defined by a wall means circumscribing and enclosing at least the upper end of said heater members in laterally outwardly spaced relation thereto, each of said heater members terminating in an upper free end defining a generally upwardly and inwardly tapering tip, means for internally heating each of said hollow members, said heater members projecting above said support a distance greater than their width with their longitudinal axes substantially in parallelism, said heater members being positioned closely together on said support with the transverse spacing between said members and adjacent said support being sufficiently close to permit the passage of melt through such spacing while restraining the flow of solid polymer particles therethrough, the spacing between the laterally outermost of said heater members and said wall means of said inlet likewise being sufficiently close to permit the passage of melt through such spacing while restraining the flow of solid polymer particles therethrough, means for discharging melt from said melting unit, and means for forming said discharging melt into filaments.

2. An apparatus according to claim 1 wherein separate inlet tubes are connected in parallel to a heating fluid supply means and extending into said hollow heating members, and further wherein each inlet tube for injecting the heating fluid into the hollow heater members terminates close to the tip of the corresponding heater member.

3. An apparatus according to claim 1 wherein the heater members are of the same shape and size, the inclined support is convex, the heater members are packed at different levels and their tips are all in one plane at the same level.

4. An apparatus according to claim 1 wherein the heater members are of the same shape and size, are packed in a concave support at different levels and their tips are all in one plane at the same level.

5. An apparatus according to claim 1 wherein the heater members have parallel sides, except for their tips.

6. An apparatus according to claim 1 wherein the heater members are spaced uniformly on the support.

7. An apparatus according to claim 1 wherein the inclined support is convex and there is provided an annular melt duct at the periphery of the support which leads into a central melt channel.

8. An apparatus according to claim 1 wherein the pressure feed means for feeding the solid polymer particles through the feed passage comprises a screw conveyor.

9. An apparatus according to claim 8 wherein the pressure of the screw conveyor is kept constant by means comprising a compressed spring.

References Cited in the file of this patent

UNITED STATES PATENTS

| 1,035,395 | Stebbins | Aug. 13, 1912 |
| 1,349,853 | Peden | Aug. 17, 1920 |
| 2,227,845 | Rogers | Jan. 7, 1941 |
| 2,253,176 | Graves | Aug. 19, 1941 |
| 2,336,159 | Bent | Dec. 7, 1943 |
| 2,369,506 | Weibel | Feb. 13, 1945 |
| 2,411,971 | MacMillin et al. | Dec. 3, 1946 |
| 2,571,975 | Waltz | Oct. 16, 1951 |
| 2,791,802 | Weber | May 14, 1957 |

FOREIGN PATENTS

| 113,346 | Great Britain | Feb. 21, 1918 |
| 881,721 | Germany | July 2, 1953 |